United States Patent Office 3,531,689
Patented Sept. 29, 1970

3,531,689
SOLID STATE OVERCURRENT RELAY
Robert Horn, Richardson, Tex., assignor to Forney Engineering Company, Dallas, Tex., a corporation of Texas
Filed June 10, 1968, Ser. No. 735,876
Int. Cl. H02h 3/08; H01h 47/18
U.S. Cl. 317—36   2 Claims

ABSTRACT OF THE DISCLOSURE

A solid state overcurrent relay for protecting an alternating current circuit. The relay circuit comprises infinitely adjustable means for selecting any desired one of an infinite number of time versus current functions, whereby the relay is of universal application, being infinitely adjustable to fit the individual characteristics of any circuit with which it is used.

BACKGROUND OF THE INVENTION

Field of the invention

This invention relates to overcurrent relays and more particularly to solid state or static circuits for protecting electrical apparatus and/or transmission lines from damage due to excessive currents.

Description of the prior art

While it has been proposed in the past to use solid state circuits for overcurrent relays, such proposals have required that such circuits be tailored to fit the specific requirements, such as time/current functions, of each application. Examples are to be found in Graham et al. Pat. #3,290,556, dated Dec. 6, 1966; and Lipnitz et al. Pat. #3,327,171, dated June 20, 1967. In each case there was no provision in a single basic circuit for the selection of any desired one of an infinite number of time/current function curves, continuously adjustable within certain limits, so that such selection is any desired one of such infinite number thereof. Such problem is solved in the present case by a single basic circuit that is of universal application by virtue of the incorporation therein of applicant's novel current/time adjustment means in such circuit. A custom built circuit having individual components or tap switches to satisfy the specific requirements of each different application is thus avoided.

SUMMARY OF THE INVENTION

The invention provides a solid state overcurrent relay for protecting an alternating current circuit which is the combination comprising a circuit for monitoring the current amplitude of such alternating current circuit; and a circuit which acts to convert such current amplitude to a voltage proportional thereto. Infinitely adjustable means are associated with the current-voltage circuit for predetermining the minimum voltage value at which the relay is preset to start operating. A detector circuit is also provided that is responsive to such minimum voltage value. A function generating circuit is provided that is responsive to the output of the current-voltage circuit, which operates to generate a selected output signal consisting of an infinite number of such functions, comprising adjustable means for selecting any desired one of such functions. Connected thereto is a timing circuit, the time-operation of which is initiated by the output of the detector circuit. Such time-operation is a function of the value of the output signal of the function generating circuit and a direct function of a preselected time function. Adjustable means are associated with the timing circuit for setting the value of the time constant; and connected to the later is a circuit the output of which is responsive to the completion of such time-operation for initiating action to protect such alternating current circuit.

The function generating circuit preferably comprises a log function generator responsive to the output of said current-voltage circuit and having an output voltage that is the logarithm (log) of such voltage and therefore the monitored current (I). A multiplying circuit is also provided that is responsive to such log I output for multiplying the value of such log I by a factor $n$ to produce an output signal that is proportional to the value of $n$ log I. Adjustable means are associated with the multiplying circuit for setting the value of the factor $n$; as well as an anti-log function generator responsive to such $n$ log I output signal, having an output voltage the value of which is proportional to the anti-logarithm (anti-log) of the signal, i.e. current (I) to the $n$th power ($I^n$). The time-operation is an inverse function of the $I^n$ value of the output signal of said anti-log function generator circuit, and a direct function of the time contsant.

DESCRIPTION OF THE PREFERRED EMBODIMENT

Figure 1:
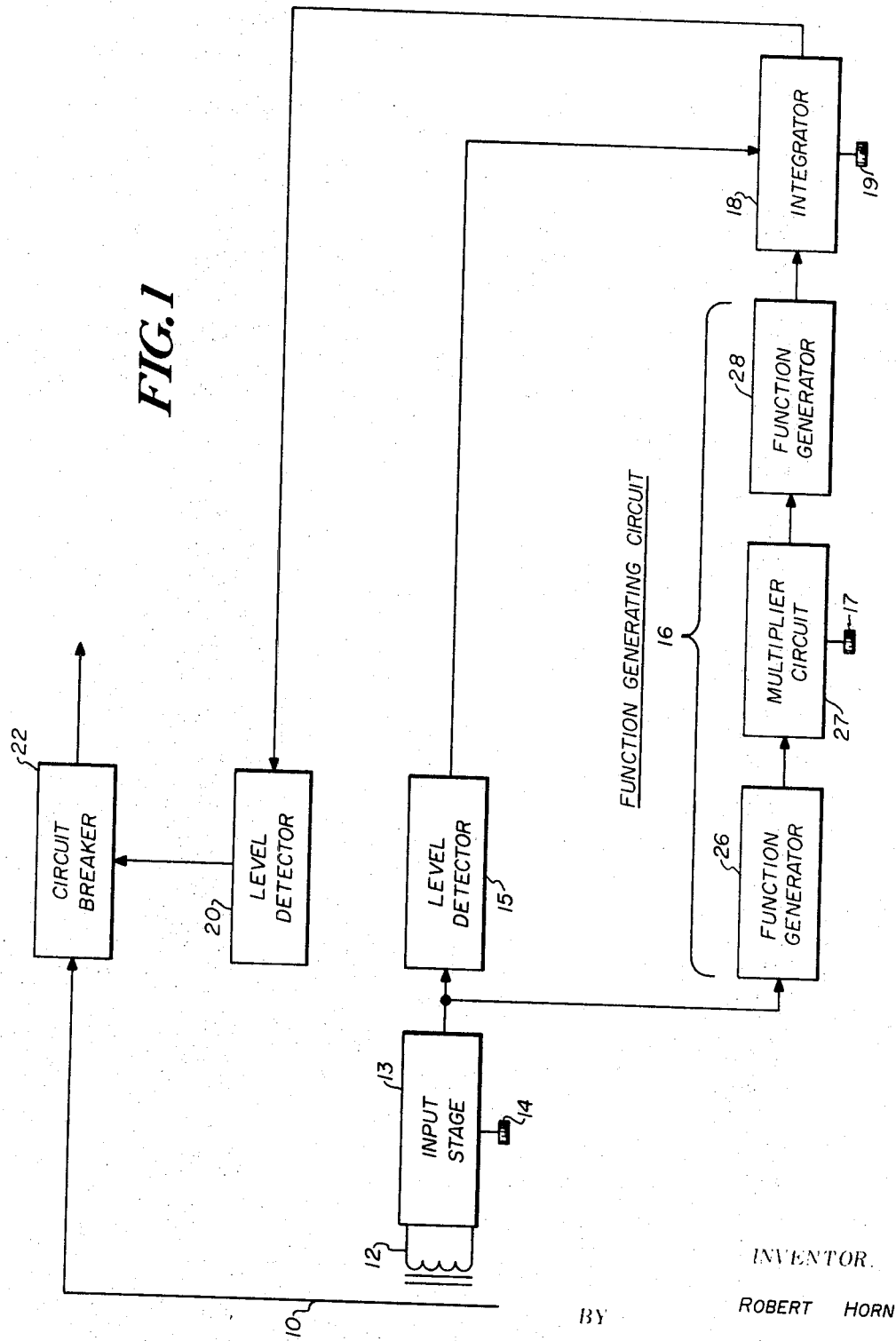
FIG. 1 is a block diagram illustrative of the invention.

The first part of this description will cover the block diagram of FIG. 1. The current ($i$) of AC line 10 to be protected is monitored by a current transformer 12 which feeds input stage 13 of the solid state overcurrent relay. This input stage has an adjustment 14 for setting the inverse time trip value of current (I) of the relay.

The output $i/I$ of the input stage 13 goes to level detector circuit 15, and to function generating circuit 16. This functioning generating circuit 16 comprises a function generator 26, a multiplier circuit 27, and a function generator 28. Function generator 26 takes the log of ($i/I$). The multiplier circuit 27 is provided with adjustable means 17 for setting a multiplication factor $n$, so that the output is $n$ log ($i/I$). Function generator 28 takes the antilog of its input so that its output is $(i/I)^n$. This output is fed into an integrator 18 comprising a timing circuit, which has adjustable means 19 for setting time constant, K. The output of integrator 19 is held to zero by level detector 15 as long as ($i/I$) is less than 1.

When ($i/I$) is greater than or equal to 1, the level detector 15 energizes the integrator 18 to start integrating. The output of the integrator goes to level detector circuit 20 and as soon as it reaches reference voltage level C1, level detector 20 initiates an output. Since the value of C1 is fixed, the time required for the output of the integrator 18 to reach this value is a function of its input, $(i/I)^n$, and the setting of the value of time constant K.

In this example, the function being generated is $(i/I)^n$, where $n$ and I are adjustable. By modifying the function generator blocks, this can be made any mathematical or arbitrary function desired.

Figure 2:
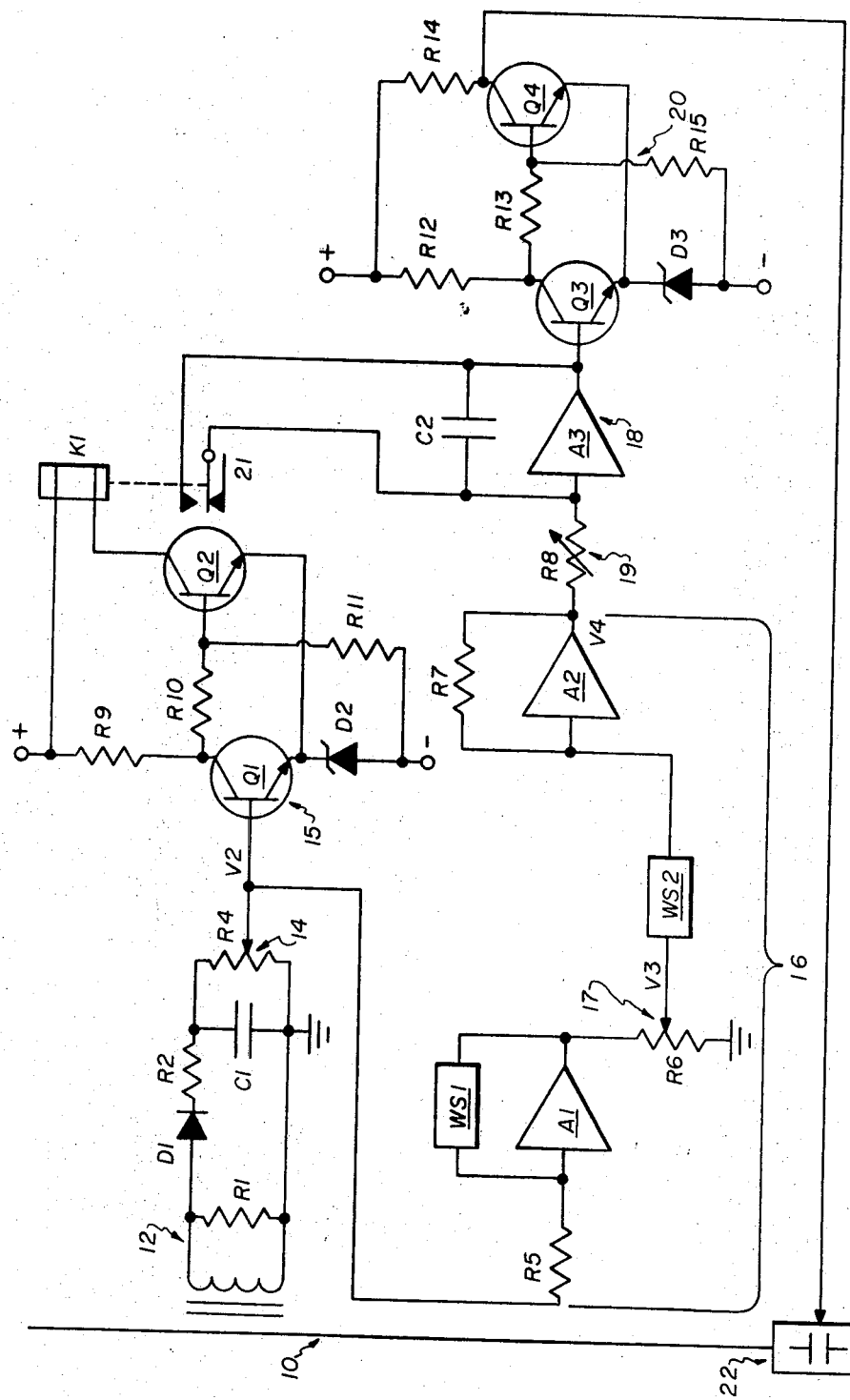
FIG. 2 is a circuit diagram thereof.

FIG. 2 is a somewhat more detailed circuit diagram. The output current of current transformer 12 is passed through resistor R1 to develop a voltage proportional to such current. This voltage is then rectified by diode D1 and filtered by resistor R2 and capacitor C1, and applied across potentiometer R4.

The input to the level detector 15 is the voltage V2 which is taken off potentiometer R4. The level detector circuit 15 includes: the transistors Q1 and Q2; the resistors R9, R10 and R11; and the diode D2. The function of this level detector 15 is to start the integrator 18 when the value of current reaches the inverse time trip value, $i=I$. Voltage V2 is also fed to operational amplifier A1, which has a diode wave shaping network WS1 as its feedback element. Operational amplifier A1 and its feedback network WS1 take the log of voltage V2 and apply its across potentiometer R6.

The output of potentiometer R6, voltage V3, is applied to operational amplifier A2, which has another diode wave shaping network WS2 as its input element. This amplifier A2 takes the anti-log of voltage V3, and has voltage V4 as its output. Potentiometer R6 has the function of the multiplier 27 in FIG. 1, so that the voltage V3 equals $n \log V2$, and voltage V4, which is the anti-log of V3, is $(V2)^n$ wherein $n$ is dependent upon the setting of potentiometer R6.

The level detector circuit 20 includes: transistors Q3 and Q4; resistors R12, R13, R14, and R15; and diode D3. Voltage V4 is applied to operational amplifier A3, which is provided with capacitor C2 as its feedback element, making it an integrator (timing circuit 18). The time constant K of this integrator is adjusted by varying the value of R8. A relay K1 is connected in the circuit to prevent the output of the integrator 18 from changing as long as voltages V2 below, .5 volts, for example, the trip value. As soon as voltage V2 has reached the trip value (.5 volts), the relay contact 21 will open. Now integrator 18 can start to integrate. As soon as the output of amplifier A3 reaches a value of approximately 10 volts, for example, the output of the level detector 20 consisting of transistor Q3 and Q4 goes high enough to initiate the protective action. This results in the tripping of circuit breaker 22, opening the line 10, which prevents any damage to the equipment due to overcurrents.

The invention thus provides an overcurrent relay for protecting AC circuits, that can be made as a unit for general use. The units can be manufactured on a production line basis, one unit being like another. Since the basic circuit in each unit contains an infinite number of time/current functions, the one required for each application is obtained simply by adjusting the infinitely adjustable means of the circuit so that the required time/current function is selected to fit exacly the requirements of such application.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:
1. A solid state overcurrent relay for protecting an alternating current circuit, comprising in combination:
   a circuit for monitoring the current amplitude of such alternating current circuit;
   a circuit acting to convert such current amplitude to a voltage proportional thereto;
   adjustable means associated with said current-voltage circuit for predetermining the minimum voltage value at which the relay is preset to start operating;
   a detector circuit responsive to such minimum voltage value;
   a function generating circuit responsive to the output of said current-voltage circuit, which operates to generate a selected output signal of an infinite number of such functions, comprising infiinitely adjustable means for selecting any desired one of such functions;
   a timing circuit, the time-operation of which is initiated by the output of said detector circuit, such time-operation being a function of the value of the output signal of said function generating circuit and a direct function of a preselected time function;
   infinitely adjustable means associated with said timing circuit for setting the value of the time constant; and
   a circuit the output of which is responsive to the completion of such time-operation for initiating action to protect such alternating current circuit.
2. A solid state overcurrent relay as defined by claim 1, in which said function generating circuit comprises:
   a log-function generator responsive to the output of said current-voltage circuit and having an output voltage that is the logarithm (log) of such voltage and therefore the monitored current (I);
   a multiplying circuit responsive to such log I output for multiplying the value of such log I by a factor ($n$) to produce an output signal that is proportional to the value of $n \log I$;
   adjustable means associated with said multiplying circuit for setting the value of the factor $n$; and
   an anti-log function generator responsive to such $n \log I$ output signal, having an output voltage the value of which is proportional to the anti-logarithm (anti-log) of the signal, i.e. current (I) to the $n$th power ($I^n$); and
   the time operation is an inverse function of the $I^n$ value of the output signal of said anti-log function generator and a direct function of the time constant.

References Cited

UNITED STATES PATENTS

| | | | |
|---|---|---|---|
| Re. 25,762 | 4/1965 | Kotheimer | 317—36 |
| 3,317,791 | 5/1967 | Price et al. | 317—36 |
| 3,444,434 | 5/1969 | Zocholl | 317—36 |

JAMES D. TRAMMELL, Primary Examiner

U.S. Cl. X.R.

317—33, 142